US005936255A

United States Patent [19]

Nakanishi et al.

[11] Patent Number: 5,936,255

[45] Date of Patent: Aug. 10, 1999

[54] X-RAY, NEUTRON OR ELECTRON DIFFRACTION METHOD USING AN IMAGING PLATE AND APPARATUS THEREFOR

[75] Inventors: Kenji Nakanishi, Inzai; Akira Tsukamoto, Toda; Keiichi Tanabe, Ichikawa, all of Japan

[73] Assignees: Sharp Kabushiki Kaisha, Japan; International Superconductivity Technology Center, Japan

[21] Appl. No.: 08/890,623

[22] Filed: Jul. 9, 1997

[30] Foreign Application Priority Data

Jul. 9, 1996 [JP] Japan .................................... 8-179481

[51] Int. Cl.[6] .................................................. G01N 23/207

[52] U.S. Cl. ............................ 250/583; 378/40; 378/90; 209/589

[58] Field of Search .............................. 250/583; 378/40, 378/90; 209/589

[56] References Cited

U.S. PATENT DOCUMENTS 5,003,570 3/1991 Whiting .................................... 378/75

5,245,648 9/1993 Kinney et al. ............................ 378/43

*Primary Examiner*—Constantine Hannaher

*Assistant Examiner*—Andrew Israel

*Attorney, Agent, or Firm*—Lorusso & Loud

[57] ABSTRACT

An X-ray, neutron or electron diffraction method, which is devoid of the defects of conventional diffraction apparatus using an imaging plate, which can analyzing a sample, in a non-destructive mode without contact and with a good S/N ratio, even when the sample significantly generates fluorescence or scattered X-rays. The method includes the steps of irradiating a predetermined area of the sample with an X-ray, neutron or electron beam whose axis is oriented at a fixed direction to obtain a diffraction ray, rotating the sample while maintaining the irradiated predetermined area substantially unchanged and while maintaining the angle between the axis of the X-ray, neutron or electron beam relative to the tangential plane of the predetermined area substantially unchanged, forming an image of the diffraction ray from the sample during the rotation of the sample through every predetermined angle using an imaging plate, reading a data of the image formed on the imaging plate to obtain an output data for each rotation of the sample through the predetermined angle, and processing the output data to obtain desired analysis information.

10 Claims, 4 Drawing Sheets

X-RAY, NEUTRON OR ELECTRON DIFFRACTION METHOD USING AN IMAGING PLATE AND APPARATUS THEREFOR

BACKGROUND OF THE INVENTION

This invention relates to an X-ray, neutron or electron diffraction method and an apparatus therefor for analyzing a sample, such as various materials and devices, in non-destructive mode and without contact.

As an apparatus for analyzing a sample, such as various materials and devices, in non-destructive mode and without contact, there has been hitherto widely used an apparatus utilizing X-ray diffraction. As a detector for such an apparatus, a solid state detector, a scintillation counter, a proportional counter or a film has been conventionally used. Recently, an imaging plate (photoluminescent sheet), a position sensitive proportional counter detector, an arrayed solid state detector and a position sensitive proportional detector have been developed.

Of these various detectors, the imaging plate has merits that it is a two-dimensional detector, it has a high sensitivity and a wide dynamic range and it provides highly fine and precise detection. The imaging plate has an additional merit that the data processing is easy, because the imaging plate permits image data to be converted into two-dimensional digital data by analogue/digital conversion.

The imaging plate, however, does not have energy resolution. Namely, when an X-ray diffraction image is formed using the imaging plate, the image data of respective pixels are those measured as a set of various photons occurring during the scanning through a full scanning angle of a sample. As a result, depending upon the elements contained in the sample, noises resulting from fluorescence, scattered X-rays from air or apparatus parts and inelastic scattering cannot be separated from X-ray diffraction, so that the S/N ratio is extremely low and the detection performance is very low. For example, in analyzing a sample such as a superconductor film grown on a substrate, not only the required information of the film but also information, including fluorescence and diffraction, from the substrate are detected together, so that the detection performance is unsatisfactory.

SUMMARY OF THE INVENTION

The present invention has been made for solving the problems of the conventional diffraction device using an imaging plate and is aimed at the provision of a technique which can analyze a sample in a non-destructive mode, without contact and with good S/N ratio, even when the sample generates significant amounts of fluorescence and scattered X-rays.

In accomplishing the foregoing object, there is provided in accordance with the present invention an X-ray, neutron or electron diffraction method of analyzing a sample, comprising the steps of:

irradiating a predetermined area of said sample with an X-ray, neutron or electron beam whose axis is oriented at a fixed direction;

rotating said sample while maintaining said irradiated predetermined area substantially unchanged and while maintaining the angle between said axis of said X-ray, neutron or electron beam relative to the tangential plane of said predetermined area substantially unchanged;

forming an image of a diffraction ray from said sample during the rotation of said sample through every predetermined angle using an imaging plate;

reading said image formed on said imaging plate to obtain output data for each rotation of said sample through said predetermined angle, and processing said output data to obtain desired analysis information.

Preferred embodiments of the X-ray, neutron or electron diffraction method according to the present invention are as follows:

(1) The sample is rotated at a constant rotating speed through an angle of from 0 to 180 degrees.

(2) The predetermined angle is not greater than 10 degrees.

(3) The processing of the output data includes a difference treatment of the output data for respective rotation of the sample through the predetermined angle.

(5) The processing of the output data includes an integration treatment of the output data for respective rotation of the sample through the predetermined angle, the integration treatment including a step of removing diffraction peak information.

(6) The sample is a single crystal film.

(7) The sample is amorphous or polycrystal.

The present invention also provides an X-ray, neutron or electron diffraction apparatus for analyzing a sample by irradiating a predetermined area of said sample with an X-ray, neutron or electron beam whose axis is oriented at a fixed direction and by detecting the diffraction ray from said sample, comprising:

rotating means for rotating said sample while maintaining said irradiated predetermined area substantially unchanged and while maintaining the angle between said axis of said X-ray, neutron or electron beam relative to the tangential plane of said predetermined area substantially unchanged;

an imaging plate for forming an image of the diffraction ray from said sample during the rotation of said sample through every predetermined angle;

data detecting means for reading said image formed on said imaging plate to obtain output data for each rotation of said sample through said predetermined angle, and processing means for processing said output data obtained during each rotation of said sample through said predetermined angle, thereby obtaining desired analysis information.

Preferred embodiments of the X-ray, neutron or electron diffraction apparatus according to the present invention are as follows:

(1) Slit means including a plurality of angularly equally spaced apart thin plates radially extending with the irradiated area as the center and rotatable with the irradiated area as the center of rotation is disposed between the sample and the imaging plate.

(2) The imaging plate is substantially hemispherical in shape.

BRIEF DESCRIPTION OF THE DRAWINGS

Other objects, features and advantages of the present invention will become apparent from the detailed description of the preferred embodiments of the invention which follows, when considered in light of the accompanying drawings, in which.

DETAILED DESCRIPTION OF THE PREFERRED EMBODIMENTS OF THE INVENTION

Figure 1:
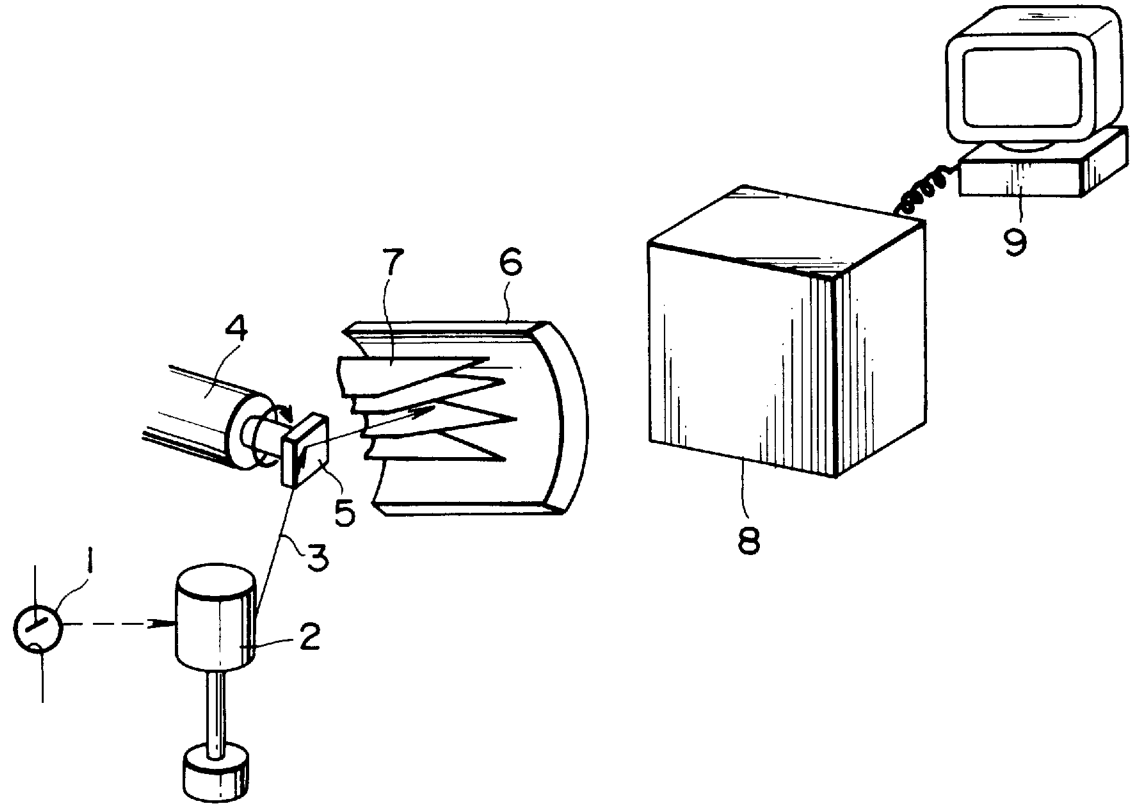
FIG. 1 is a perspective external view schematically illustrating an embodiment of an X-ray diffraction apparatus using a Weissenberg X-ray camera according to the present invention.

In the diffraction method according to the present invention, a sample is irradiated with X-ray, neutron or electron beam to analyze the sample.

As the sample, any solid material such as a bulk, film, powder of various forms such as spherical, columnar and plate-like shapes, may be used. Various conventionally known diffraction methods may be utilized, depending on the sample.

A specific example of a suitable sample is a film supported on a substrate. The film may be a single crystal film, amorphous film or polycrystal film.

In the present invention, a predetermined area of the sample is irradiated with an X-ray, neutron or electron beam with a predetermined angle of incidence while rotating the sample. In this case, the sample rotating conditions are as follows:

(i) the predetermined area of the sample to be irradiated with the X-ray, neutron or electron beam is maintained unchanged; and (ii) the angle of the axis of the X-ray, neutron or electron beam relative to the tangential plane of the predetermined area is maintained substantially unchanged.

When the area to be measured is flat, the tangential plane of the predetermined area coincides with the flat surface. When the area to be measured is curved, the tangential plane a plane which touches with the curved surface and which is normal to the radius of curvature of the curved surface.

It is preferred that the sample be rotated through an angle of 0–180 degrees. In this case, the rotation may be continuous rotation or intermittent rotations each through a predetermined angle corresponding to the image formation for rotation through the predetermined angle. The rotational speed is preferably constant. The rotation of the sample may be effected by using conventionally known rotation means customarily used in the X-ray diffraction.

As the detector for the diffracted rays, an imaging plate is utilized in the present invention. The imaging plate will be explained below.

The imaging plate is constructed of a substrate and a coating of fine crystals of a photoluminescent material ($BaFBr:Eu^{2+}$, etc.) uniformly formed on the substrate. When the imaging plate is irradiated with an X-ray, neutron or electron beam, there are formed metastable color centers (so-called F-centers) in the photoluminescent material. Upon being irradiated with a visible light, the F-centers are extinguished with the simultaneous emission of photoluminescence. The intensity of the emission is proportional to the intensity of the X-ray, neutron or electron beam with which the imaging plate has been irradiated. The imaging plate is a two-dimensional, integration-type detector of X-ray, neutron and electron beams utilizing the above phenomenon. The image remaining after the reading can be completely removed by irradiation with a visible light so that the imaging plate can be repeatedly used.

The diffraction image irradiated on the imaging plate is accumulated therein as concentration distribution of F-centers to form a latent image thereon. As an effective exciting light source for reading the latent image, there may be used, for example, a He-Ne laser (oscillation wave length: 633 nm). Since the photoluminescent spectrum has a peak at about 390 nm, a photomultiplier may be suitably used. Thus, the imaging plate on which the diffraction image has been formed is two-dimensionally scanned with a focused laser beam to emit photoluminescence. The spectrum intensity of the emission is measured with the photomultiplier. The analogue data thus obtained are converted into digital data, which in turn are reconstructed into two dimensional data by a computer.

The imaging plate has excellent performance, such as a detection sensitivity of 0.1 cps, a dynamic range of over $10^5$ and space resolution of 80 $\mu$m square. As described previously, however, the imaging plate has no energy resolution and hence, in the case of X-ray diffraction, it is impossible to separate the diffracted X-rays from noises when the sample significantly produces fluorescent X-rays and scattered X-rays. Therefore, the S/N ratio is small and the detection performance is low.

The present invention does not form an image of the diffracted rays from the sample through a full rotational angle on an imaging plate as has been conventionally done. Rather, there is adopted a technique in which an image of the diffracted rays from the sample obtained for each increment of rotation of the sample through a predetermined angle is formed on the imaging plate. The predetermined angle is preferably 10 degrees or less. For example, the diffraction is carried out for respective ranges of angle such as 0–5 degrees, 5–10 degrees, 10–15 degrees and so on.

The images of diffracted rays formed on the imaging plate in every rotation of the sample through the predetermined angle are subjected to image reading using, for example, the above-mentioned laser beam and signal detection by a photomultiplier, thereby obtaining output data (diffraction intensity of each two-dimensional pixels) for respective rotations of the sample through the predetermined angle.

The output data for respective rotations of the sample through the predetermined angle are processed to obtain desired information. Typical processing may be as follows:

(i) The output for respective rotations of the sample through the predetermined angle is subjected to a difference treatment (inclusive of differential treatment).

(ii) The output data for respective rotation of the sample through the predetermined angle is subjected to an integration treatment. It is possible to obtain data of, for example, only polycrystal or amorphous sample, when the integration treatment includes the removal (smoothing treatment) of diffraction pattern data resulting from single crystal.

In the present invention, a rotary slit member may be disposed between the sample and the imaging plate. The rotary slit is constructed of a plurality of thin plates which are angularly equally spaced apart from each other and which are oriented radially with the area of the sample to be irradiated with X-ray, neutron or electron beam as the center. The slit is rotatable with the area of the sample to be irradiated with X-ray, neutron or electron beam as a center of rotation. In the case of X-ray, the thin plates may be made of iron or stainless steel. The slit is rotated for the purpose of avoiding the presence of portions which are not irradiated with the X-ray, neutron or electron beam due to the presence of the slit. By using the rotary slit in addition to the above-described technique, influence of fluorescent X-rays and scattered X-rays can be minimized to ensure an improved S/N ratio.

One embodiment of the present invention will be described with reference to the drawings. While the illustrated embodiment is concerned with X-ray diffraction, it is without saying that the embodiment also applies to the neutron diffraction and electron diffraction.

FIG. 1 is a perspective exterior view schematically illustrating an embodiment of an X-ray diffraction device using a X-ray Weissenberg camera according to the present invention.

In FIG. 1, the reference numeral 1 designates an X-ray generating device, 2 a monochromator, 3 an X-ray beam, 4 a sample rotation mechanism, 5 a sample, 6 an imaging plate mounted on an X-ray Weissenberg camera (not shown), 7 a rotary slit, 8 an image processing device for reading a diffracted X-ray image formed on the imaging plate 6, 9 a data processing device and 10 designates a memorizing device. As the sample 5, a $BaCuO_2$ film grown on a $SrTiO_3$ substrate was used. As an X-ray source of the X-ray generating device 1, MoKα was used.

The X-ray radiated from the X-ray generating device 1 was introduced into the monochromator 2 to obtain the X-ray beam 3 which had improved parallelism and narrow wave length width. A surface of the sample 5 was irradiated with the X-ray beam 3 with a determined angle of incidence (α=6 degrees), so that an image of the diffracted rays was formed on the imaging plate 6. In this case, the sample rotation mechanism 4 was so operated that the sample 5 was rotated while maintaining the area of the sample 5 irradiated with the X-ray beam 3 substantially unchanged and while maintaining the angle of the axis of the X-ray beam 3 relative to the surface of the sample 5 substantially unchanged. Further, the irradiation with the X-ray was carried out while subjecting the sample 5 to in-plane rotation with the X-ray irradiation area of the sample as a center of rotation at a rotation speed of 2 degrees per minute for every rotation of 5 degrees. The overall rotation angle was 180 degrees.

A rotary slit 7 composed of 30 pieces of stainless steel thin plates arranged radially at an angular distance of 5 degrees with the X-ray irradiation area of the sample as a center was disposed between the sample 5 and the imaging plate 6 for minimizing the influence of scattered X-rays and fluorescent X-rays. The rotary slit 7 was rotated in both directions at a revolution rate of 5 degrees per second.

Figure 2:
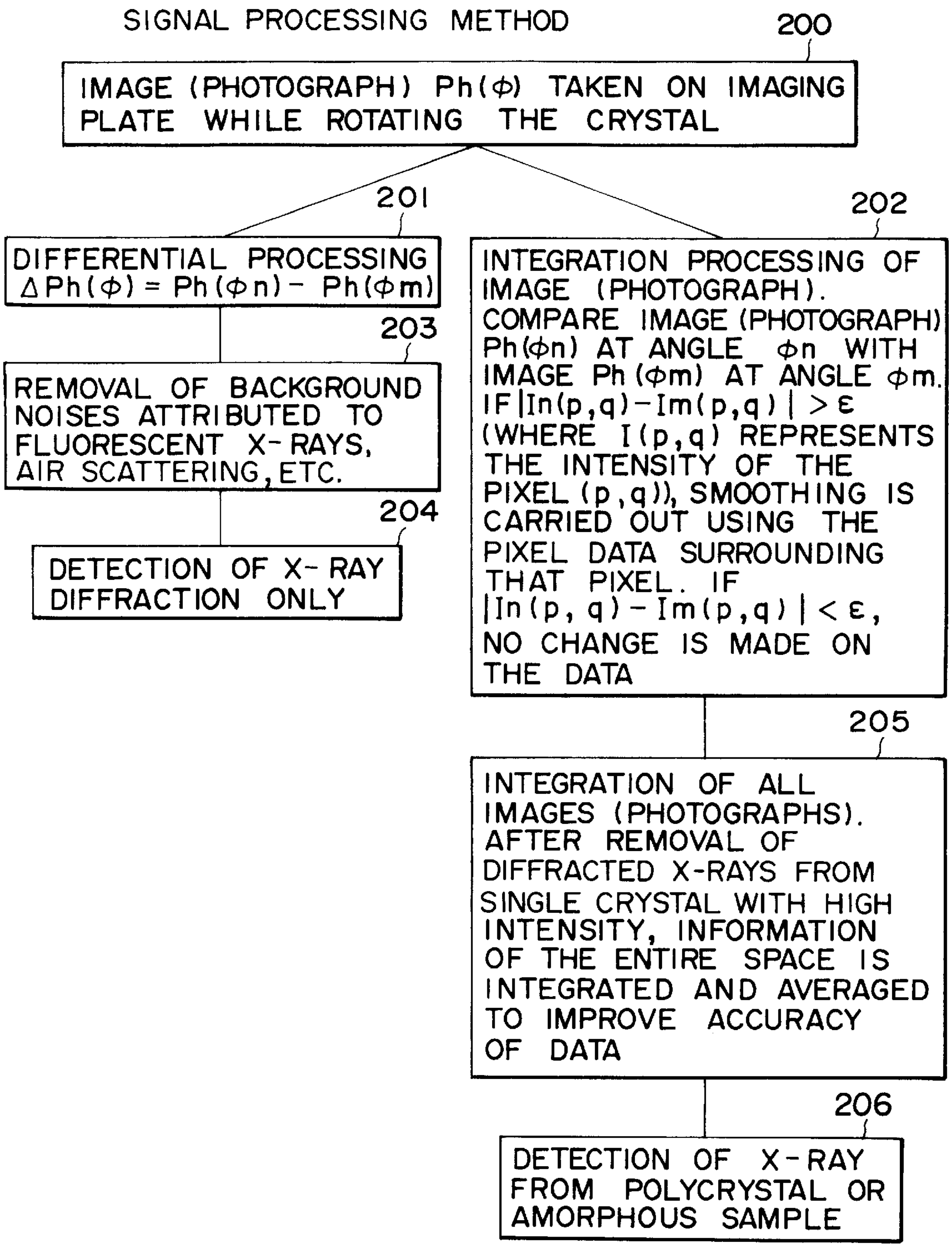
FIG. 2 is a flow chart showing the processing procedure in the embodiment of the present invention.

As soon as a X-ray diffraction image for a rotation through the predetermined angle was formed on the imaging plate 6, another imaging plate 6 was substituted therefor. The X-ray diffraction image on the imaging plate 6 was treated as described previously by the image processing device 8 using a laser beam. Thus, the imaging plate 6 was divided into a multiplicity of pixels and counts for respective pixels were determined to obtain two-dimensional diffraction data. The foregoing operation was repeated. The two-dimensional diffraction data were sent to the data processing device 9 and processed as shown in FIG. 2.

The arithmetic processing in the data processing device 9 will now be described.

The image (photograph) Ph(ϕ) formed on the imaging plate 6 while rotating the crystal (Step 200) is subjected to differential processing $\{\Delta Ph(\phi)=Ph(\phi n)-Ph(\phi m)\}$ (Step 201). By this processing, background noises attributed to, for example, fluorescent X-rays and scattered X-rays by air are removed (Step 203), so that only X-ray diffraction can be detected (Step 204).

The image (photograph) Ph(ϕ) formed on the imaging plate 6 while rotating the crystal (Step 200) is subjected to integration processing (Step 202). Thus, the image (photograph) Ph(ϕn) at angle ϕn is compared with the image Ph(ϕm) at angle ϕm. In this case, the intensity of a pixel (p, q) of the image (photograph) is expressed as I(p, q). If $|In(p, q)-Im(p, q)|>\epsilon$, smoothing is carried out using the pixel data surrounding that pixel. If, on the other hand, $|In(p, q)-Im(p, q)|<\epsilon$, then no change is made on the data. Such a processing is integrated for entire image (photograph) (integration and averaging of the information for the entire space (through 180 degrees)). As a consequence, the diffracted X-rays from a single crystal having a high intensity is removed (Step 205), so that X-ray from a polycrystal or amorphous sample only can be detected (Step 206).

Figure 3A:
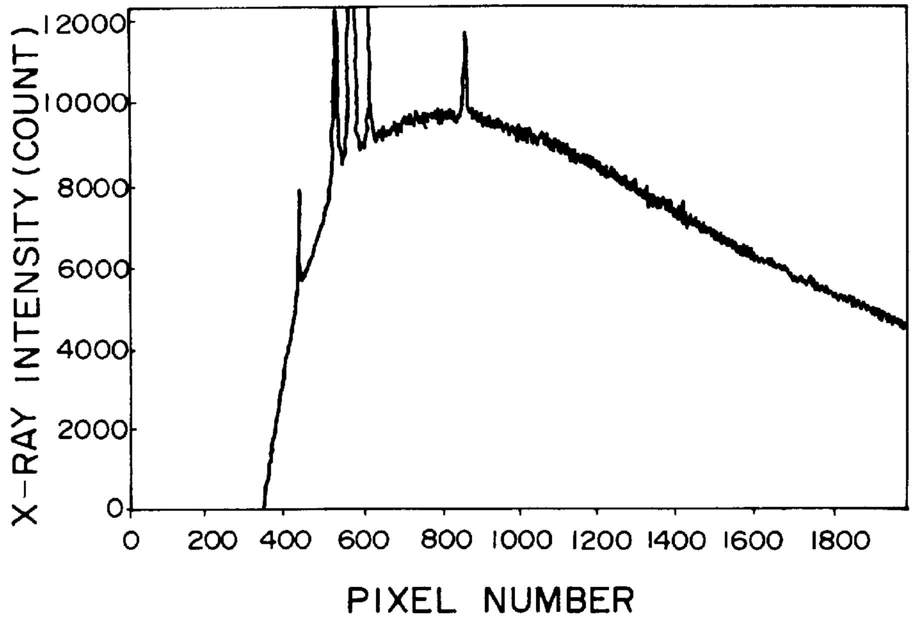
FIG. 3(*a*) is a schematic Weissenberg photograph (X-ray diffraction pattern photograph) using MoKα as X-ray source and FIG. 3(*b*) is a diagram showing the X-ray intensity distribution of the pattern (prior art)
Figure 3B:
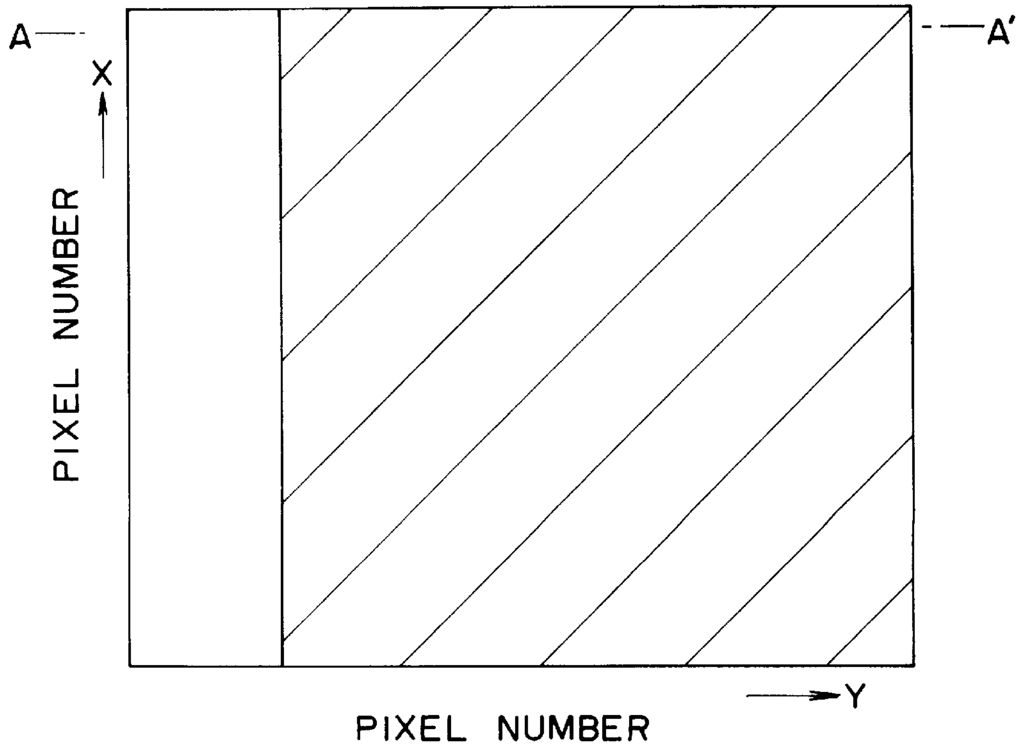

In the above X-ray diffraction apparatus, since the sample 5 is rotated at a constant rate, it is possible to obtain X-ray intensity at all X-ray diffraction points by rotating the sample from 0 to 180 degrees. FIG. 3 illustrates a schematic Weissenberg photograph (X-ray diffraction pattern photograph) obtained by the conventional method and a diagram showing the X-ray intensity distribution of the pattern, while FIG. 4 shows a schematic Weissenberg photograph (X-ray diffraction pattern photograph) obtained according to the embodiment of the present invention and a diagram showing the X-ray intensity distribution of the pattern.

The above FIGS. 3(*a*) and 4(*a*) are X-ray intensity distribution of the line A-A' of the Weissenberg photographs of FIGS. 3(*b*) and 4(*b*), respectively. The black spots XP in the schematic illustration of the Weissenberg photograph in FIG. 4(*b*) correspond to the peaks of the X-ray intensity in FIG. 4(*a*). The shadow portion of FIG. 3(*b*) indicates that the background noises are so significant that the spots corresponding to the peaks in FIG. 3(*a*) are extremely weak.

Figure 4A:
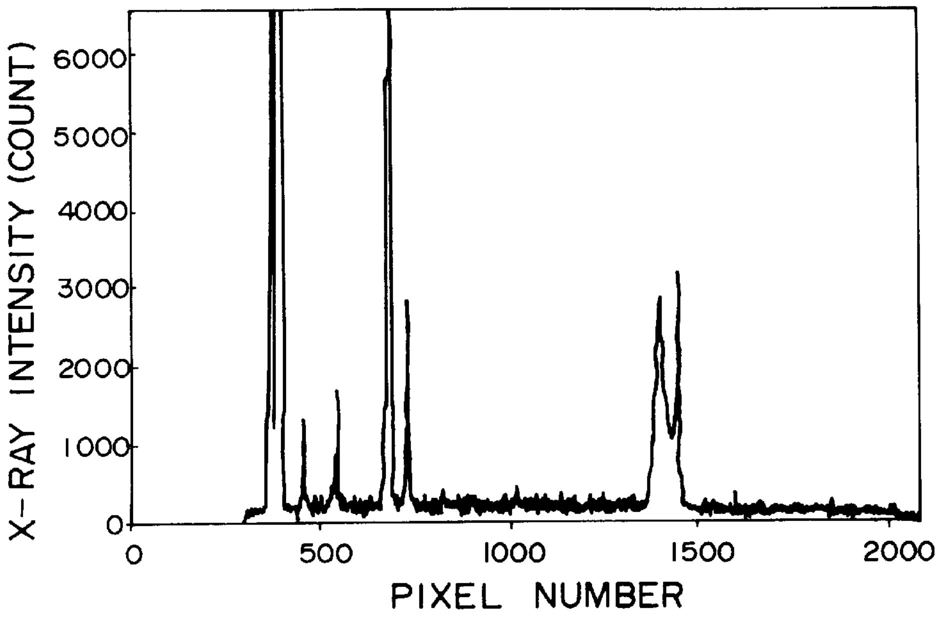
FIG. 4(*a*) is a schematic Weissenberg photograph (X-ray diffraction pattern photograph) using MoKα as X-ray source and FIG. 4(*b*) is a diagram showing the X-ray intensity distribution of the pattern.
Figure 4B:
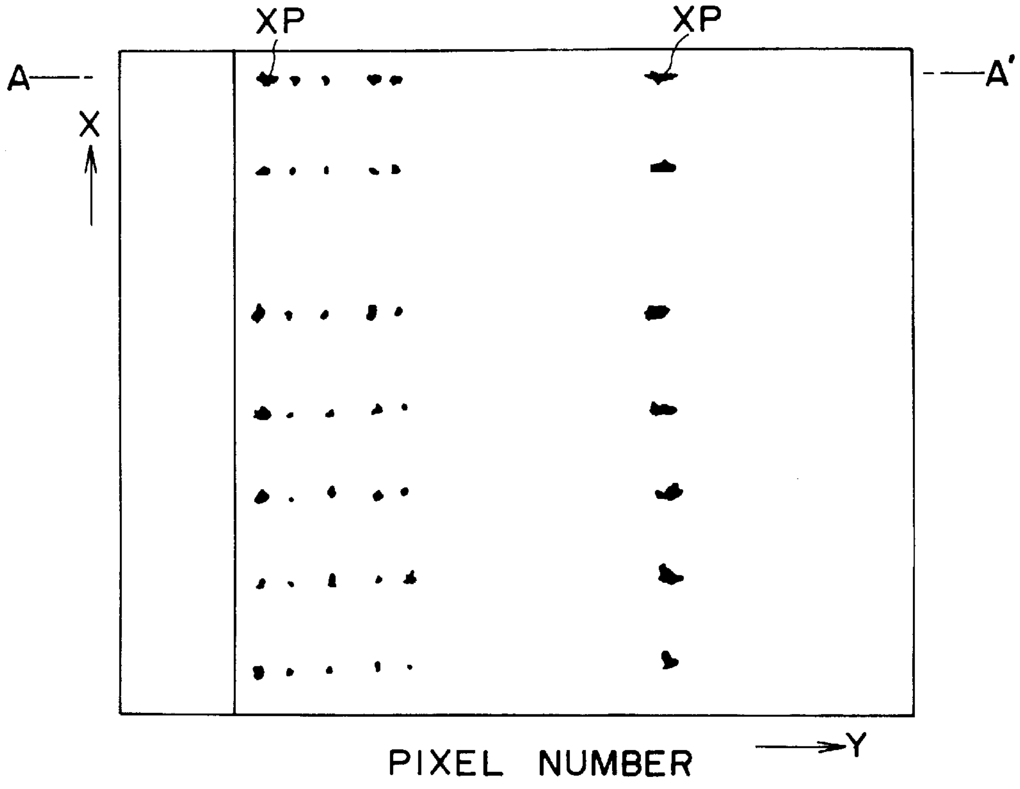

When FIGS. 3(*a*) and 3(*b*) are compared with FIGS. 4(*a*) and 4(*b*), it will be appreciated that, with the apparatus according to the embodiment of the present invention, background noises due to fluorescence and scattering apparently disappeared and the X-ray diffraction points only are extracted, so that the S/N ratio is improved. In the case of FIGS. 4(*a*) and 4(*b*), the S/N ratio was improved at least 1,000 times that in the case of FIGS. 3(*a*) and 3(*b*).

According to the present invention, since the above constitution is adopted, the defects of an imaging plate are removed, so that the X-ray, neutron or electron diffraction using the imaging plate can be carried out with an improved S/N ratio.

Further, the present invention can be suitably applied to the examination of various materials, devices and products constituted thereof without contact and in a non-destructive mode.

According to the present invention, since the above constitution is adopted, the defects of an imaging plate are removed, so that the X-ray, neutron or electron diffraction using the imaging plate can be carried out with an improved S/N ratio.

Further, the present invention can be suitably applied to the examination of various materials, devices and products constituted thereof without contact and in a non-destructive mode.

Incidentally, the shape of the imaging plate may be semicircular, flat, hemispherical, etc.

What is claimed is:

1. An X-ray, neutron or electron diffraction method of analyzing a sample, comprising the steps of:

irradiating a predetermined area of said sample with an X-ray, neutron or electron beam whose axis is oriented in a fixed direction;

rotating said sample while maintaining said irradiated predetermined area substantially unchanged and while maintaining an angle between said axis of said X-ray, neutron or electron beam, relative to a tangential plane of said predetermined area, substantially unchanged;

forming a separate diffraction image from said sample during rotation of said sample for each of plural increments of rotation through a predetermined angle using an imaging plate;

reading each of said diffraction images to obtain a data output for each increment of rotation of said sample through said predetermined angle, and processing said data outputs for the plural increments of rotation to obtain desired analysis information.

2. A method as claimed in claim 1, wherein said sample is rotated at a constant rotating speed through a total angle of 180 degrees.

3. A method as claimed in claim 1, wherein said predetermined angle is not greater than 10 degrees.

4. A method as claimed in claim 1, wherein said processing of said data outputs includes differential processing of said data outputs for respective increments of rotation of said sample through said predetermined angle.

5. A method as claimed in claim 1, wherein said processing of said data outputs includes an integration treatment of said data outputs for respective increments of rotation of said sample through said predetermined angle, said integration treatment including a step of removing diffraction peak information.

6. A method as claimed in claim 4, wherein said sample is a single crystal film.

7. A method as claimed in claim 5, wherein said sample is amorphous or polycrystal.

8. An X-ray, neutron or electron diffraction apparatus for analyzing a sample by irradiating a predetermined area of said sample with an X-ray, neutron or electron beam whose axis is oriented in a fixed direction, to obtain a diffraction image of said sample, comprising:

rotating means for rotating said sample while maintaining said irradiated predetermined area substantially unchanged and while maintaining the angle between said axis of said X-ray, neutron or electron beam and a plane tangential to said predetermined area substantially unchanged;

an imaging plate on which the diffraction image of said sample is formed during an increment of rotation of said sample through a predetermined angle;

data detecting means for reading each image corresponding to said increment of rotation to obtain a data output for each increment of rotation of said sample through said predetermined angle, and processing means for processing a plural number of said data outputs, thereby obtaining desired analysis information.

9. An apparatus as claimed in claim 8, wherein said imaging plate is substantially hemispherical in shape.

10. An apparatus as claimed in claim 8, further comprising slit means disposed between said sample and said imaging plate, said slit means including a plurality of angularly equally spaced apart thin plates radially extending with said irradiated area as the center, said slit means being rotatable with said irradiated area as the center of rotation.

* * * * *